UNITED STATES PATENT OFFICE.

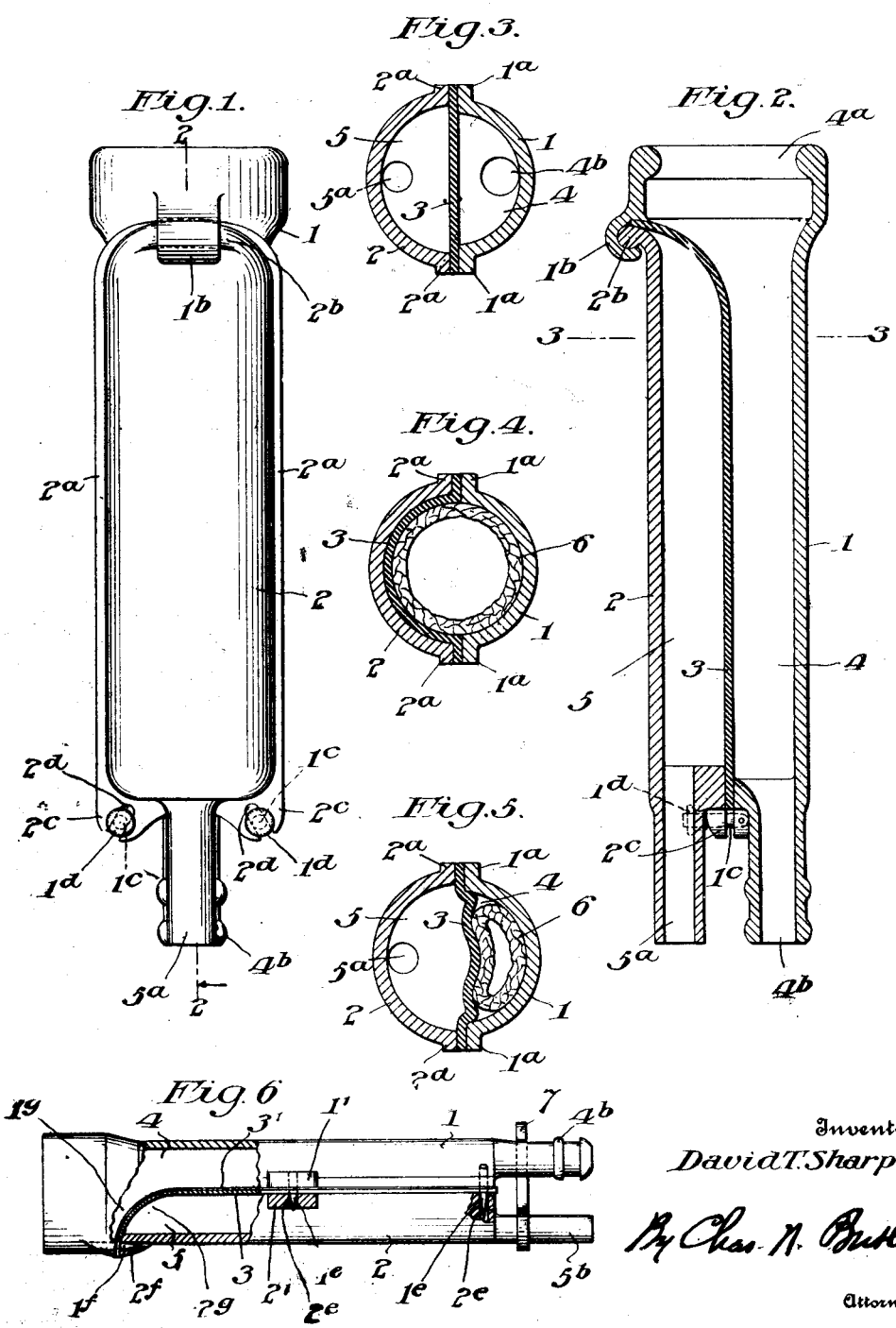

DAVID TOWNSEND SHARPLES, OF WEST CHESTER, PENNSYLVANIA.

MILKING APPARATUS.

1,182,107.           Specification of Letters Patent.       Patented May 9, 1916.

Application filed October 18, 1915. Serial No. 56,404.

*To all whom it may concern:*

Be it known that I, DAVID T. SHARPLES, a citizen of the United States, residing at West Chester, in the county of Chester and State of Pennsylvania, have invented certain Improvements in Milking Apparatus, of which the following is a specification.

My improved apparatus is a teat cup adapted for use in pneumatic milking machines, and it comprises, in its preferred form, a comparatively rigid shell provided with separable sections having ducts connected therewith, in combination with a flexible sheet having its edges clamped between the segments, whereby two chambers separated by a pulsatory diaphragm are provided.

The primary object of my improvements is to provide an efficient teat cup that is economical in the use of air, simple in construction, readily accessible, easily cleaned and provided with a diaphragm that is not readily destructible and can be replaced at smaller cost than and is superior in character, as also in convenience and sanitary qualities, to the usual tubular diaphragm.

An object attained is the provision of a construction permitting the use of and including simple means for protecting the diaphragm proper from contact with the milk.

The characteristic features of the invention are embodied in the specific constructions described in the following descriptions and illustrated in the accompanying drawings.

In the drawings, Figure 1 is an elevation of a form of the teat cup selected to illustrate the invention; Fig. 2 is a longitudinal sectional view of the same taken on the line 2—2 of Fig. 1; Fig. 3 is a transverse sectional view taken on the line 3—3 of Fig. 2; Fig. 4 is a transverse sectional view of the device with an expanded teat therein; Fig. 5 is a transverse sectional view of the same with the diaphragm pressed against the collapsed teat; and Fig. 6 is a broken side elevation representing modifications in the construction.

The invention, in the form illustrated in Figs. 1 to 5 of the drawings, comprises a metal shell having the complementary sections 1 and 2 provided with the respective bearings $1^a$ and $2^a$ (preferably flanged outwardly) between which the edges of a thin sheet 3 are clamped. The bearings and the sheet or diaphragm extend longitudinally from the bottom of the shell throughout the greater part of its length and thence continue in a curve extending to the side of the shell near its top. The diaphragm and the sections of the split shell thus form a chamber 4 having an opening $4^a$ at its top for the reception of a teat and a nipple or duct $4^b$ at its bottom for use in exhausting this chamber, in combination with a chamber 5 provided with a nipple or duct $5^a$ for use in exhausting and applying pressure to this chamber, whereby the diaphragm 3 is pulsated.

The section 1 has on one side thereof near the top a hook $1^b$ providing an open curved bearing which is continuous with the bearings $1^a$, and on the opposite sides of its lower end the pivoted bolts $1^c$ provided with the knurled nuts $1^d$. The section 2 has, at its top, a knuckle $2^b$ providing a curved bearing continuous with the bearings $2^a$ and adapted to be engaged and turned in the bearing $1^b$. The flanges $2^c$, at the bottom of the section and continuous with the bearing flanges $2^a$, are provided with the slots $2^d$ into which the bolts $1^c$ can be swung, the bearings $2^a$ being pressed against the edges of the diphragm 3 and pressing the same against the bearings $1^a$ by screwing the nuts $1^d$ up on the bolts against the flanges. The distances between the terminals or edges of the cylindrical surface of the section 2 are made slightly greater than those of the section 1 so that when the diaphragm 3 is collapsed against the section 2 the greater part of the teat 6 inserted in the cup will expand in contact with a contour of substantially circular cross section.

The parts of this construction are readily separable upon loosening the knurled nuts and their surfaces are exposed so that they can be cleansed thoroughly with facility. The parts are adapted to be assembled in proper operative relation by positioning the diaphragm between the bearings of the sections and clamping the latter together. As usual rubber diaphragms of teat cups deteriorate and must be replaced, a marked desideratum is effected by the provision for the use of diaphragms that are merely plain heets which can be obtained by cutting suitable sections from sheet rubber and other flexible material. But the deterioration from use is much less in my device than in teat cups having tubular linings, which wear and break along longitudinal lines due to the fact that the rubber is bent sharply, wears and fails along such lines, the collapsed tubes being of substantially triangular or very flat elliptical cross sections. If the usual tubular lining be sufficiently large in diameter to substantially fit the interior of the teat cup shell, it collapses to a cross sectional form having sharply bent angles which are pressed against the shell and worn by the rubbing contact as well as weakened by the bending. If the tubular lining be made small or the shell large to avoid this rubbing contact, an unduly large air chamber must be filled and emptied in the successive pulsations incidental to milking.

As illustrated in Fig. 6, the diaphragm 3 may be separated from the milk in the chamber 4 by providing it with a removable lining 3' formed of inexpensive and substantially impervious material, such as treated paper, which could be discarded after a single use.

The section 1 is provided with flanges 1' and with the pins 1ᵉ extending transversely to the length of the cup and the pins 1ᶠ extending longitudinally thereof.

The section 2 is provided with flanges 2' registering with the flanges 1', with the holes 2ᵉ for receiving the pins 1ᵉ and with the holes 2ᶠ for receiving the pins 1ᶠ.

The sections are connected and clamped together upon the diaphragms 3 and 3' by passing the pins 1ᶠ through the diaphragms into the holes 2ᶠ, with the parts 1 and 2 held in a slightly angular relation and then drawing the sections together by turning the curved bearing or knuckle 2ᵍ on the curved bearing 1ᵍ so as to pass the pins 1ᵉ through the diaphragms into the holes 2ᵉ. A hook 7 turns on the nipple 5ᵇ and engages the nipple 4ᵇ to clamp the parts together.

Having described my invention, I claim:

1. In a teat cup, a shell having separable sections and a diaphragm clamped between said sections, said diaphragm and the respective sections forming separate chambers and said diaphragm adapted to press a teat in one of said chambers.

2. In a teat cup, a shell and a flexible sheet dividing the interior of said shell into plural compartments, said diaphragm adapted to press a teat in one of said compartments.

3. In a teat cup, a shell comprising separable sections having longitudinal bearings, in combination with a diaphragm clamped between said sections, and forming non-communicating chambers in said shell.

4. In a teat cup, a longitudinally split shell having sections provided with passages, in combination with a diaphragm clamped between said sections, whereby compartments are formed with which said passages communicate.

5. In a teat cup, a split shell comprising sections having coacting bearings extending longitudinally from the bottom thereof and outwardly near the top, in combination with a flexible diaphragm clamped between said bearings, one of said sections having an opening in the top thereof.

6. In a teat cup, a split shell having separable sections, means for securing said sections together, and a flexible diaphragm clamped between said sections, whereby separate compartments are formed, one of said compartments having an opening for the reception of a teat.

7. In a teat cup, a shell having a section provided with an open bearing, a section provided with a bearing engaged in turning relation with said bearing first named, a diaphragm disposed between said sections, and means for clamping said sections together on said diaphragm, whereby separate compartments are formed.

8. In a teat cup, a split shell having sections with corresponding bearings extending longitudinally from the bottom and curving outwardly near the top, means whereby one of said sections is connected with the other in fulcrumed relation, and means for clamping said sections together.

9. In a teat cup, a shell having a separating means forming two compartments, said means comprising a main diaphragm and an auxiliary protecting diaphragm therefor.

10. In a teat cup, a split shell having coacting bearings, in combination with a diaphragm clamped between said bearings, the distance between the bearings of one of said shells being greater than the distance between the bearings of the other.

In testimony whereof, I have hereunto set my name this 15th day of October, 1915.

DAVID TOWNSEND SHARPLES.